3,110,644
METHOD OF REINFORCING RUBBER ARTICLES
Roger Gordon Aitken, St. Hilaire Station, Quebec, Canada, assignor to Canadian Industries Limited, Montreal, Quebec, Canada, a corporation of Canada
No Drawing. Filed Feb. 16, 1961, Ser. No. 89,624
Claims priority, application Great Britain Mar. 15, 1960
4 Claims. (Cl. 156—298)

This invention relates to articles made of rubber or rubber-substitutes reinforced with filaments, fibres, yarns, fabrics and the like derived from aromatic polyesters, and provides a composition and method for treating such fibrous material to effect its adhesion to rubber or rubber-substitutes.

A recent major improvement relating to the reinforcement of articles made of rubber or rubber-substitutes, hereinafter simply referred to as rubber articles or articles of rubber, with fibrous material derived from aromatic polyesters has been described in co-pending U.S. Patent application Serial No. 826,398, filed July 13, 1959, now abandoned. The method described and claimed in that co-pending application is practical and provides satisfactory results. It is, however, time and space consuming in that it requires separate applications of two differing coating compositions. Unfortunately, all efforts directed to provide a practical and satisfactory method requiring only one application of an adhesive coating composition acceptable to industry for lack of toxicity problems and problems associated with solvent recovery, had failed.

It has now surprisingly been found that the second of the coating compositions disclosed in the above-mentioned co-pending application may be modified in such a manner that the separate application of the first coating composition can be dispensed with.

It is, therefore, the main object of the present invention to provide a practical method of bonding fibrous material derived from polymethylene terephthalates to rubber articles, by means of only one adhesive coating composition.

The present invention, thus, provides a method of reinforcing articles of vulcanisable rubber with fibrous material derived from polymethylene terephthalates, comprising application to the fibrous material of a composition which includes a major proportion of a rubber latex adhesive and a minor proportion of a compatible modifier, as hereinafter defined, heating the composition when applied to the fibrous material and, thereafter, bonding the fibrous material to the rubber.

The present invention also provides an adhesive coating composition which includes a major proportion of a rubber latex adhesive and a minor proportion of a compatible modifier, as hereinafter defined.

Moreover, the present invention provides rubber articles reinforced with fibrous material derived from polymethylene terephthalate which is bonded to the rubber by a bond derived, inter alia, from a composition which includes a major proportion of a rubber latex adhesive and a minor proportion of a compatible modifier, as hereinafter defined.

The rubber latex adhesive is preferably a dispersion of a suitable vinylpyridine copolymer latex (such as General Tire and Rubber Co.'s "Gen-Tac" brand vinylpyridine latex) in an aqueous solution of resorcinol and formaldehyde adjusted to a pH which will give satisfactory performance with the particular rubber article to be reinforced, and must be allowed to age before use. Latices other than those based on polyvinylpyridine, known in the art as adhesives for rubber articles may also be used when, like the preferred latex, they have been dispersed in resorcinol (or other phenolic substance such as phenol or catechol) and formaldehyde solutions, and have been allowed to age. Such other latices would include the rubbery copolymers of styrene and butadiene-1,3 (GRS) and butyl rubber latex such as "Enjay MD–655"; these latices may also be used in combination with or in place of natural rubber latex. It will, however, generally be desirable to base the choice of any particular rubber latex adhesive for use according to the present invention upon properties of the particular type of rubber to be reinforced.

The rubber latex adhesives referred to above are generally anionic in nature and the modifier, to be compatible with these dispersions should, therefore, not be cationic in nature lest the latices might coagulate. Suitable compatible modifiers are preferably anionic dispersions of compounds which include polymerised vinyl halide or vinylidene halide groups. Amongst these compounds may be mentioned the various homopolymers of vinyl chloride or vinylidene chloride and mixtures thereof as well as copolymers of, for example, vinyl chloride and vinyl acetate, vinyl chloride and vinylidene chloride, vinyl chloride and acrylonitrile, vinylidene chloride and acrylonitrile, terpolymers of vinyl chloride, vinyl acetate and maleic anhydride, mixtures thereof, or any other copolymers or mixtures thereof of vinyl or vinylidene chloride and ethylenically unsaturated compounds, or mixtures of the homopolymers and the copolymers.

The modifiers composition may include minor amounts of tertiary amines such as ethyl morpholine. Alternatively, quaternary ammonium compounds such as benzyl trimethyl ammonium acetate which yield an amine on heating may be included and so may amines which have an active hydrogen atom. Since the latter compounds may react with an aldehyde such as formaldehyde essentially present in the latex dispersion, it may be necessary to block the active hydrogen atom (by reaction with, for example, formaldehyde or glyoxal) before the compounds are added to the modifier composition. Amines are, however, preferably added directly to the rubber latex adhesive after the latter has been allowed to age, rather than to the modifier which would then subsequently be added to the latex dispersions.

It may also be desirable to add directly to the aged rubber latex adhesive, rubber compounding additives such as vuncanisers, anti-oxidants or accelerators. Most beneficial results have, for example, been obtained by adding small amounts, say 1 to 10% based on the weight of the aged rubber latex adhesive, of dithiocarbamates. The sodium dialkyl dithiocarbamates such as, for example, sodium dimethyl-, diethyl- or dibutyl dithiocarbamates are very effective in increasing the strength of the bond between the fibrous material and the rubber. Also effective in this respect are other dithiocarbamates such as the zinc salts of the above-mentioned dialkyl dithiocarbamates, sodium monobutyl dithiocarbamate, sodium piperazine dithiocarbamate and di-β-hydroxyethyl-ammonium-di-β-hydroxyethyl dithiocarbamate. It will, in general, be of advantage to allow rubber latex adhesives to age for a further period of time after the above-mentioned compounds have been added thereto.

The bond between the fibrous material and the vulcanisable rubber is generally effected by a heat treatment, usually under pressure, using temperatures common in the vulcanisation of rubbers. Satisfactory bonds may be obtained with most rubbers (compounded for vulcanisation) amongst which may be mentioned articles composed of any natural rubber, including gutta percha and balata; compounded rubber; modified rubber, for example, hydroxylated rubbers; condensation derivatives of rubber and cyclised rubber; synthetic rubber-like diene polymers and copolymers, for example, the butadiene-styrene interpolymers and butadiene-acrylonitrile interpolymers; butyl rubbers; and rubber-like isobutylene polymers or copolymers.

The adhesive coating composition of the present invention will usually have at least 60% of the rubber latex adhesive, but may have as little as 5% or even less by weight of the compatible modifier to achieve the main object of the invention. If the compatible modifier is an anionic dispersion of polyvinyl chloride, from 10 to 15% by weight thereof have given the most satisfactory results.

When the amount of compatible modifier in the adhesive coating composition is reduced to below 10% by weight, it may be useful to increase the period of heat treatment in the bonding step to obtain satisfactory results. Under these circumstances, it may also be advantageous to increase the amount of compatible modifier actually applied to the fibrous material. To this end the rubber latex adhesive may be made up to a higher solids content than is usual in the industry, or an adhesive coating composition of normal solids content may be applied to the fibrous material several times.

The application of the coating composition to the fibrous material may be effected in any suitable manner. It is generally preferred to apply the coating by dipping the fibrous material, loose or under tension, into the coating composition. However, the latter may also be applied by spraying or brushing. Normally it is desirable that at least 1% and preferably from 3 to 25% of the solids content of the coating composition by weight of the fibrous material be deposited on the fibrous material before the latter is heated and, subsequently, subjected to the bonding step.

It will be appreciated that the fibrous material must be heated after the coating composition has been applied thereto, before it is subjected to the bonding step. Heating for about 4 mins. at about 220° C. is generally satisfactory for this purpose, but these conditions may be varied. For example, a decrease in the temperature will not markedly affect the final result provided the fibrous material is exposed to the heat treatment for an increased period of time. Conversely, by increasing the temperature the duration of the heat treatment can often be shortened.

The following examples illustrate the present invention without in any way limiting its scope. Other ways of carrying the invention into effect will readily be apparent. All prats are parts by weight. The fibrous material used was tyre cord of polyethylene terephthalate made by spinning a 48-filament yarn of this polyester, drawing the yarn, twisting 4 of these singles into a ply and finally doubling 2 of these plies into cord having a resulting twist of 12 x 12 t.p.i. and denier of approximately 2400.

*Example 1*

To 38 parts of "Gen-Tac" brand polyvinyl pyridine latex was added a solution of

| | Parts |
|---|---|
| Water | 56 |
| Resorcinol | 2.2 |
| Formaldehyde (37%) | 3.5 |

The pH of the mixture was adjusted to 9.0 with 10% sodium hydroxide solution and the resultant latex dispersion was allowed to age for 48 hours.

9 parts of the rubber latex adhesive so obtained were modified after aging with 1 part of an emulsion of polyvinyl chloride (Geon 151) having a solids content of 60%. Tyre cord was dipped into this mixture allowing about 7% of the solid content of the mixture, by weight of the cord, to remain on the cord. Excess of the mixture was removed and the cord so treated was heated for 4 minutes at 220° C., while the cord was held under tension. Thereafter, the cord was embedded ¼ inch in a natural rubber tyre carcass stock by the usual process of vulcanising under pressure in a mould.

The results of static tests using the "H" type single cord adhesive method showed a bond strength of 24.5 lbs.

A cord treated with unmodified rubber latex adhesive and embedded ¼ inch in a different portion of the same rubber stock as used above showed, after vulcanisation, a bond strength of only 13 lbs. according to the above text.

*Example 2*

To 47 parts of "Gen-Tac" brand polyvinyl pyridine latex was added a solution of

| | Parts |
|---|---|
| Water | 30 |
| Resorcinol | 15 |
| Formaldehyde (37%) | 8 |

The mixture was allowed to stand for 7 days.

10% by weight of an emulsion of polyvinyl chloride (Geon 151) having a solids content of 60% was then added as modifier to the rubber latex adhesive so obtained.

Tyre cord was treated with this mixture as in Example 1 above.

In a static test using the "H" type single cord adhesive method a bond strength of 24.0 lbs. was obtained which compared with a bond strength of 16.9 lbs. using the unmodified rubber latex adhesive.

Any suitable polyvinyl chloride such as "Geon" 576 may replace the modifier composition used in the above examples.

Also in the above two examples the natural rubber stock may be replaced with GRS rubber, or other rubbers commonly bonded to fibrous material derived from rayon or nylon.

*Example 3*

This example illustrates that good bonds may be obtained even at elevated temperatures, provided a dispersion of an accelerator (e.g. sulphur/zinc oxide) is added to the aged latex dispersion before use thereof according to the present invention.

To 10 parts of the rubber latex adhesive of Example 1 above were added 1 part of an emulsion of polyvinyl chloride (Geon 151) and 0.2 part of vulcanising dispersion C–97 (R. T. Vanderbilt Co., The Vanderbilt Rubber Handbook, eighth edition, 1942, page 239). Tyre cord was dipped into this mixture and treated as in Example 1 above. After vulcanising in ¼ inch GRS rubber tyre carcass stock, the H-test specimen were heated for 3 minutes at 125° C. between steel plates. The bond strength was determined immediately after the heating was discontinued and found to be 22.7 lbs.

Tyre cord treated in a similar manner but in the absence of vulcanising dispersion C–97 from the coating composition, was found to have a bond strength of 17.5 lbs.

*Example 4*

To 10 parts of the rubber latex adhesive of Example 1 were added 0.24 part of an aqueous solution (47% total solids) of sodium dibutyl dithiocarbamate, i.e. about 6% based on the weight of the latex adhesive, and 1 part of an emulsion of polyvinyl chloride having a solids content of about 50%. This mixture was allowed to age for 24 hours before being applied to tyre cord and being embedded in rubber as in Example 1.

In static tests using the "H" type single cord adhesive method, bond strengths exceeding 28.0 lbs. were obtained.

What I claim is:

1. A method of reinforcing articles of vulcanisable rubber with fibrous material derived from polymethylene terephthalate which comprises applying to the fibrous material an adhesive composition comprising at least 60% by weight of a dispersion of a vinyl pyridine copolymer latex in an aqueous alkaline solution of resorcinol and formaldehyde and from 5% to 15% by weight of an anionic dispersion of polyvinyl chloride, heating the composition after application to the fibrous material and thereafter embedding said coated fibrous material in the vulcanisable rubber and vulcanising the rubber.

2. A method as claimed in claim 1 wherein the adhesive composition after application to the fibrous material is heated at 220° C.

3. A method as claimed in claim 1 wherein the adhesive composition contains 2% by weight of a sulphur/zinc oxide-containing vulcanising dispersion.

4. A method as claimed in claim 1 wherein the anionic dispersion of polyvinyl chloride contains from 1% to 10%, by weight of the adhesive composition, of sodium dibutyl dithiocarbamate.

References Cited in the file of this patent

UNITED STATES PATENTS

| | | |
|---|---|---|
| 2,902,398 | Schroeder | Sept. 1, 1958 |
| 2,990,313 | Knoles | June 27, 1961 |
| 3,031,431 | Rye | Apr. 24, 1962 |
| 3,051,594 | Aitken | Aug. 28, 1962 |